Patented Sept. 7, 1954

2,688,611

UNITED STATES PATENT OFFICE 2,688,611

LIGNIN SULFATES AND THEIR PRODUCTION

Rufus V. Jones, Bartlesville, Okla., assignor to Phillips Petroleum Company, a corporation of Delaware No Drawing. Application December 19, 1949,
Serial No. 133,951

23 Claims. (Cl. 260—124)

1

This invention relates to lignin sulfates and methods for their production. In one of its more specific aspects it relates to metal lignin sulfates and methods for their production. In still another of its more specific aspects it relates to tertiary amine salts of lignin sulfates and their production.

Certain derivatives of lignin are known in the prior art. For instance, lignin sulfonates have long been available from by-products of the paper industry. I have now invented new derivatives of lignin, namely lignin sulfates, and methods for their production. The lignin sulfates of my invention can be used in a variety of applications, such as in adhesives, rubber, inks, ore flotation, as a water loss reducing agent or time of set increasing agent in Portland cement slurries used in cementing deep wells, and as viscosity and/or water loss control agents in water base well drilling muds. By the methods of my invention both the alkali metal and the group II-A metal lignin sulfates can be obtained. Examples of these derivatives of my invention are the sodium, potassium, lithium, magnesium, calcium, strontium and barium lignin sulfates. Also, by a method of the process of my invention I produce tertiary amine salts of lignin sulfate.

It is an object of my invention to provide lignin sulfates and methods for their production.

It is another object of my invention to provide metal lignin sulfates and methods for their production.

It is a further object of my invention to provide tertiary amine salts of lignin sulfates and methods for their production.

Other objects and advantages of the process of my invention will become apparent, to one skilled in the art, upon reading this disclosure.

Lignin is considered to be a naturally occurring polymer of many homogeneous units, having a unit molecular weight of approximately 840 each, containing four methoxy groups, four or more hydroxyl groups, and perhaps one carbonyl group. Each unit can be represented by the formula

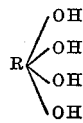

2 wherein R represents the portion of the lignin unit other than the four hydroxyl groups.

In one embodiment of my invention I have discovered that alkali metal and group II-A metal sulfates of lignin can be prepared by reacting lignin with a solid chlorosulfonate of an alkali metal or group II-A metal, a non-acidic medium under substantially anhydrous conditions, to form the corresponding metal sulfate. Examples of these chlorosulfonates which I prefer to use are sodium, potassium, lithium, barium and calcium chlorosulfonates. In a preferred embodiment of carrying on this process of my invention, the solid sulfonating compound is introduced into the reaction vessel beneath the surface of an inert diluent, which is preferably a hydrocarbon liquid, such as benzene, substituted benzene, such as the chlorobenzenes and toluene, dioxane and paraffinic hydrocarbons, such as hexanes, cyclohexanes, heptanes, etc., or various mixtures thereof, and the like. A tertiary amine, such as pyridine, quinoline, N,N-dimethylaniline, and alkyl derivatives thereof, such as the picolines, or various mixtures of such tertiary amines, is then added to facilitate solvation and to consume hydrogen chloride evolved during the reaction. The lignin is then introduced into the reaction vessel and the lignin is sulfated with the resultant formation of metal lignin sulfates after reaction is carried on for a moderate period of time. Other compounds having an affinity for hydrogen chloride and which do not react unfavorably with other compounds present can be used in place of the tertiary amine or in conjunction with the tertiary amine. In some cases it may be desirable to eliminate the use of an inert diluent in which the reaction takes place, in which case I find it desirable to introduce the solid metal chlorosulfonate into the reaction vessel beneath the surface of the tertiary amine. In this case the lignin is then added and the reaction carried on as before.

Although the mechanism of this reaction has not been definitely established, and it is to be understood that the scope of my invention is not to be unduly limited and that I am not to be held to or limited by the following reaction theory, it may be represented empirically by the following equation, which shows the combination of one molecule of a metal chlorosulfonate with a hydroxyl group of one of the lignin units making up the molecule of lignin:

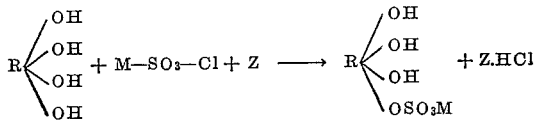

where

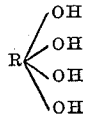

represents lignin, M is the metal and Z is a tertiary amine.

In another embodiment of my invention, I have found that lignin sulfates can be produced by reacting the complex formed between organic compounds and sulfur trioxide, lignin, and an ion-yielding salt in the presence of a tertiary amine. I find it preferable to carry on this reaction under substantially anhydrous conditions. Examples of these organic compound-$SO_3$ complexes which I prefer to use are the sulfur trioxide complexes of pyridine, dioxane, $\beta,\beta'$-dichlorodiethyl ether and N,N-dimethylaniline. Examples of the ion-yielding salts which I prefer to use are metal ion-yielding salts which are water soluble or soluble in other solvents, such as the alcohols. I prefer to use metal salts, such as alkali metal or group II-A metal halides, such as sodium, potassium, magnesium, calcium and barium chloride, alkali metal or group II-A metal hydroxides, such as sodium, potassium, magnesium, calcium or barium hydroxides, copper halides, such as copper chlorides, copper hydroxides, aluminum halides, such as aluminum chloride, aluminum hydroxide, iron halides, such as iron chlorides, nitrates, such as silver nitrates, etc. I find it desirable to use the same tertiary amines as set forth hereinabove in the discussion of the first embodiment of the process of my invention and/or other compounds having an affinity for hydrogen chloride and which do not react unfavorably with other compounds present. As discussed hereinbefore in connection with the first embodiment of the process of my invention, I find that it is desirable in some cases to employ an inert diluent. I find it desirable to use a hydrocarbon liquid, such as those set forth hereinbefore.

While the mechanism of this reaction has not been established, and it is to be understood that the scope of my invention is not to be unduly limited and that I am not to be held or limited by the following theory of reaction, it may be represented empirically by the following equation:

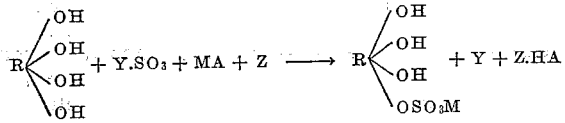

The reaction can be considered to take place in two steps, producing an intermediate tertiary amine salt of lignin sulfate in the first stage of the reaction. This first step can be empirically represented by the following equation:

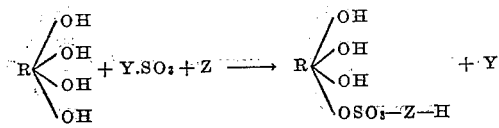

The second step can be empirically represented by the following equation:

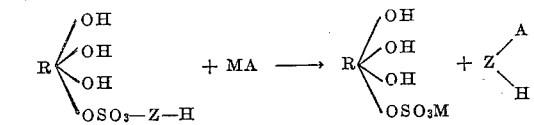

In the above equations,

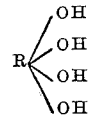

represents lignin, Y is an organic radical which forms a complex with sulfur trioxide, MA is a metal ion-yielding salt wherein M is a metal which yields a metal cation along with an anion represented by A upon ionization, and Z is a tertiary amine.

When operating using an organic compound-sulfur trioxide complex as the sulfating agent according to one embodiment of this process of my invention, lignin, the sulfating agent, and the ion-yielding salt are admixed with the tertiary amine and charged to a suitable reactor. The mixture is then heated to the desired reaction temperature for a period of from 2 to 12 hours. At the end of the reaction period the mixture is cooled and the product separated from the solvent by filtration or other suitable means. The product is the desired metal lignin sulfate.

In another embodiment of this method of my invention using an organic compound-sulfur trioxide complex as the sulfating agent, I admix lignin and the sulfating agent with a tertiary amine, charging this mixture to a reactor and heating for a period of about 2 to 8 hours. The liquid portion of the reaction mixture is decanted. The resulting tertiary amine salt of lignin sulfate is preferably washed with a solvent such as benzene or other liquid hydrocarbons to remove excess tertiary amine, then washed with an alcohol, such as methanol, ethanol, propanol, etc., to remove excess sulfating agent. To obtain the desired metal sulfate, an alkali metal or group II-A metal salt or hydroxide and the like, dissolved in an alcohol, is added.

The group II-A metal salts can also be prepared from a solution of the alkali metal lignin sulfate in a mixture of methanol, ethanol, and/or propanol, and water which has been acidified. To such a solution an alcoholic solution of a group II-A metal salt is added to obtain the corresponding divalent metal lignin sulfate as a precipitate.

The sulfation reaction of my invention, in all of its modifications, is usually carried out at a reaction temperature lying in the range from 0 to 120° C., preferably from 40 to 100° C. At the higher temperatures, pressures above atmospheric may be employed to avoid volatilization of solvent. Length of reaction time will depend on several factors such as the ratio of the reactants, the sulfating agent used, reaction temperature and the like, but will in general be in the range from 2 to 14 hours in duration.

The quantity of the sulfating agent, that is, either a chlorosulfonate of an alkali or group II-A metal, or an organic compound-sulfur trioxide complex, may vary from a small but effective amount to a considerable excess of the sulfating agent. The ratio of mols of sulfating agent to unit molecular weight of lignin should be in the range from 1:1 to 20:1, although ratios from 2:1 to 12:1 are generally preferred. Since each lignin unit has at least four hydroxyl groups, it will be apparent that varied degrees of substitution may be obtained, in part, by changing the proportion of sulfating agent within the preferred range. The tertiary amine should be supplied in an amount in the range from 1 to 50 mols per unit molecular weight of lignin. If an auxiliary diluent liquid such as benzene is not employed, the tertiary amine should be supplied in an amount in the range from 10 to 50 mols per unit molecular weight of lignin. When an auxiliary inert liquid such as benzene is employed it is usually used in an amount from 0.1 to 40 mols per unit molecular weight of lignin. The inert diluent makes the reaction mixture more easily agitated.

When operating my process using an organic compound-sulfur trioxide complex as sulfating agent, the amount of ion-yielding material should be in the range of from 1 to 20, preferably 1 to 12 mols per unit molecular weight of lignin.

The following are examples of the process of my invention. It is to be understood that I am not to be unduly limited by the compositions, temperatures, products, etc. set forth in the following examples.

Example I

Sodium chlorosulfonate (68 g. of 80 per cent) was covered with benzene (100 g.). Pyridine (200 g.) was added slowly to the mixture. Lignin (36 g.) was then added. The mass became dark colored and gummy. The mass was heated slowly until the temperature reached 90° C. and maintained at this temperature for four hours. The liquid portion was decanted, and a spongy, gummy residue remained. The residue was washed with methanol. Some dark colored product was soluble in the methanol as the washings became lighter in color with repeated washings. The residue was soluble in water to give a viscous solution. The viscous solution was precipitated by pouring it slowly into a large volume of well stirred methanol. The pH of the methanol solution was made 10 with sodium hydroxide. The residue was separated by filtering and centrifuging. The residue was re-dissolved in water and reprecipitated by adding an equal volume of methanol to the water solution. This precipitate was collected and dried in vacuum over "Drierite," a known drying agent. The dried product was sodium lignin sulfate.

Example II

Thirty-two g. of pyridine-sulfur trioxide complex was added to a mixture of 150 g. of benzene and 150 g. of pyridine. To the well stirred mixture was added 42 g. of lignin. The mixture was stirred and heated at 60° C. for three hours. Upon cooling a black resinous mass was present in the flask. The liquid portion was decanted and the resin washed with benzene and then methanol. The resinous mass was partially soluble in cold water, but completely soluble in 5 per cent sodium hydroxide solution. Methanol did not precipitate the product from the alkaline solution, but when acidified to a pH of about 2-3 a brownish flocculent precipitate formed which was separated by filtration and washed with 95 per cent ethanol to secure the sodium lignin sulfate.

Only part of the sodium lignin sulfate precipitated from the acidified water-methanol solution so that the filtrate contained dissolved sodium lignin sulfate. To this solution was added an alcoholic solution of calcium chloride. A brownish precipitate of calcium lignin sulfate separated and was purified by washing with methanol.

Example III

Sodium lignin sulfate was dissolved in a water-methanol mixture. This solution was treated with an excess of magnesium chloride in methanol. The magnesium lignin sulfate precipitated. It was washed with methanol until free of chloride ions, then with ether and dried. Analysis gave 4.6 per cent sulfur in the compound which represents 1.4 magnesium sulfate groups per lignin unit.

As will be evident to those skilled in the art, various modifications of this invention can be made, or followed, in the light of this disclosure and discussion, without departing from the spirit or scope of this disclosure or from the scope of the claims.

I claim:

1. A process which comprises reacting, in an anhydrous nonacidic medium, at a temperature in the range 0 to 120° C., for a time in the range 2 to 14 hours, lignin with an $SO_3$-group-containing compound selected from the group consisting of alkali metal chlorosulfonates, group II-A metal chlorosulfonates, sulfur trioxide-pyridine complex, sulfur trioxide-dioxane complex, sulfur trioxide-$\beta,\beta'$-dichloroethyl ether complex, and sulfur trioxide-N-dimethylaniline complex; the reaction being conducted in the presence of a nitrogen compound selected from the group consisting of pyridine, quinoline, N-dimethylaniline, and alkyl derivatives of these compounds thereof; a metal-ion-yielding salt being present when one of said sulfur trioxide complexes is present.

2. The process of claim 1 in which the reaction is conducted in the presence of an inert liquid diluent selected from the group consisting of liquid hydrocarbons, liquid chlorobenzenes, and dioxane.

3. A process for producing an alkali-metal lignin sulfate, which process comprises: introducing an alkali-metal chlorosulfonate into a reaction zone beneath the surface of a liquid hydrocarbon; adding a nitrogen compound selected from the group consisting of pyridine, quinoline, N-dimethylaniline, and alkyl derivatives thereof; adding lignin; said chlorosulfonate being present in an amount corresponding to from 2 to 12 moles per unit molecular weight of said lignin; said nitrogen compound being present in an amount of from 1 to 50 moles per unit molecular weight of said lignin; said hydrocarbon being present in an amount of from 0.1 to 40 moles per unit molecular weight of said lignin; maintaining the contents of said reaction zone substantially anhydrous and nonacidic; reacting said lignin with said chlorosulfonate at a temperature in the range 40 to 100° C. for a time in the range 2 to 14 hours; and recovering a lignin alkali-metal sulfate so produced.

4. The process of claim 3 in which said hydrocarbon is benzene.

5. The process of claim 3 in which said chlorosulfonate is sodium chlorosulfonate, and said nitrogen compound is pyridine.

6. A process for producing a lignin metal sulfate, which process comprises reacting, in a nonacidic anhydrous medium, a unit molar proportion of lignin with from 1 to 20 molar proportions of a chlorosulfonate of a group II-A metal, at a temperature in the range 40 to 100° C. for a time in the range 2 to 14 hours, in the presence of from 10 to 50 molar proportions of a nitrogen compound selected from the group consisting of pyridine, quinoline, N-dimethylaniline, and alkyl derivatives thereof, and recovering a lignin metal sulfate so produced.

7. The process of claim 6 in which the chlorosulfonate is calcium chlorosulfonate.

8. The process of claim 6 in which the chlorosulfonate is barium chlorosulfonate.

9. A process which comprises covering sodium chlorosulfonate with benzene, slowly adding pyridine, then adding lignin, heating the mixture to a temperature of about 90° C. and maintaining said temperature for four hours, decanting the liquid from the mixture, washing the residue with methanol, dissolving the residue in water, adding the solution so obtained to methanol containing sodium hydroxide and having a pH of 10 to precipitate a solid, recovering the precipitated solid, redissolving the precipitated solid in water, reprecipitating the solid by adding methanol to the solution so obtained, recovering the reprecipitated solid, and drying said solid.

10. A process which comprises reacting, in a nonacidic anhydrous medium, at a temperature in the range 40 to 100° C., for a time in the range 2 to 12 hours, one unit molar proportion of lignin with from 1 to 20 moles of sulfur trioxide-pyridine complex, in the presence of from 1 to 20 moles of a metal-ion-yielding salt and from 0.1 to 40 moles of an inert diluent, and recovering a lignin metal sulfate as a product of the process.

11. The process of claim 10 in which said metal-ion-yielding salt is an alkali-metal hydroxide.

12. The process of claim 10 in which said metal-ion-yielding salt is an alkali-metal halide.

13. The process of claim 10 in which said metal-ion-yielding salt is a halide of an alkali-earth metal.

14. The process of claim 10 in which said metal-ion-yielding salt is calcium chloride.

15. The process of claim 10 in which said metal-ion-yielding salt is sodium hydroxide, said inert diluent is benzene, and said time is in the range 2 to 8 hours.

16. A process which comprises admixing one unit molecular proportion of lignin with from 2 to 12 moles of pyridine-sulfur trioxide complex, from 1 to 50 moles of pyridine, and from 0.1 to 40 moles of benzene, heating the admixture at a temperature in the range 40 to 100° C. for a time in the range 2 to 8 hours under anhydrous nonacidic conditions; decanting a liquid from a residue so obtained; washing said residue with benzene to remove excess pyridine; washing said residue with methanol to remove excess pyridine-sulfur trioxide complex; treating said residue with an alcoholic solution of sodium hydroxide; and recovering lignin sodium sulfate as a product of the process.

17. The process of claim 16 in which said lignin sodium sulfate is further reacted with calcium chloride to produce lignin calcium sulfate.

18. The process of claim 16 in which said lignin sodium sulfate is further reacted with magnesium chloride to produce lignin magnesium sulfate.

19. A process which comprises reacting, in a nonacidic anhydrous medium, at a temperature in the range 40 to 100° C., for a time in the range 2 to 8 hours, one unit molar proportion of lignin with from 1 to 20 moles of sulfur trioxide-dioxane complex, in the presence of from 1 to 20 moles of a metal-ion-yielding salt and from 0.1 to 40 moles of a liquid hydrocarbon diluent, and recovering a lignin metal sulfate as a product of the process.

20. A group II-A metal salt of sulfated lignin.
21. A barium salt of sulfated lignin.
22. A magnesium lignin sulfate.
23. A calcium lignin sulfate.

References Cited in the file of this patent

UNITED STATES PATENTS

| Number | Name | Date |
|---|---|---|
| 1,847,709 | Baker | Mar. 1, 1932 |
| 2,379,890 | Dorland | July 10, 1945 |

OTHER REFERENCES

Freudenberg et al.: Berichte, vol. 72, 1939, pp. 331–334.